United States Patent [19]

Ali-Zaidi

[11] Patent Number: 4,477,494
[45] Date of Patent: Oct. 16, 1984

[54] PROCESS FOR FORMING RUST RESISTANT TIN OXIDE COATINGS ON GLASS CONTAINERS

[75] Inventor: Syed R. Ali-Zaidi, Shippenville, Pa.

[73] Assignee: Glass Containers Corporation, Fullerton, Calif.

[21] Appl. No.: 397,154

[22] Filed: Jul. 12, 1982

[51] Int. Cl.³ .................... B05D 5/00; B05D 1/02
[52] U.S. Cl. ...................... 427/255.3; 427/255.1; 427/255.2; 427/426; 427/427; 65/60.5; 65/60.51; 428/35; 428/432
[58] Field of Search ............ 427/165, 166, 226, 426, 427/427, 255.3, 255, 255.1, 255.2, 107, 109; 65/60.5, 60.51, 60.53; 428/35, 432

[56] References Cited

U.S. PATENT DOCUMENTS

| | | | |
|---|---|---|---|
| 3,012,902 | 12/1961 | Bayer | 117/33.3 |
| 3,093,508 | 6/1963 | Wartenberg | 117/211 |
| 3,989,864 | 11/1976 | Hey et al. | 427/407 |
| 4,100,310 | 7/1978 | Ura et al. | 427/255.3 |
| 4,123,244 | 10/1978 | Leclercq et al. | 427/226 X |
| 4,261,722 | 4/1981 | Novak | 65/60.51 |
| 4,289,816 | 9/1981 | fogelberg et al. | 428/35 |
| 4,294,868 | 10/1981 | Kalbskopf et al. | 427/166 X |

Primary Examiner—Shrive P. Beck
Attorney, Agent, or Firm—Parmelee, Miller, Welsh & Kratz

[57] ABSTRACT

Rust resistant, scratch resistant coatings are formed on glass containers during passage thereof through a tunnel at 500°–720° C. by forming a first fluid stream by passing dry air through a bath of tin tetrachloride, forming a second fluid stream by passing dry air through a bath of phosphorous trichloride or phosphorous oxychloride, combining the two fluid streams to form a fluid coating stream, and introducing the fluid coating stream containing tin tetrachloride and phosphorous halide in a weight ratio of between 2:1 to 9:1 into the tunnel to contact the hot glass containers and form a coating on the glass containers.

9 Claims, 1 Drawing Figure

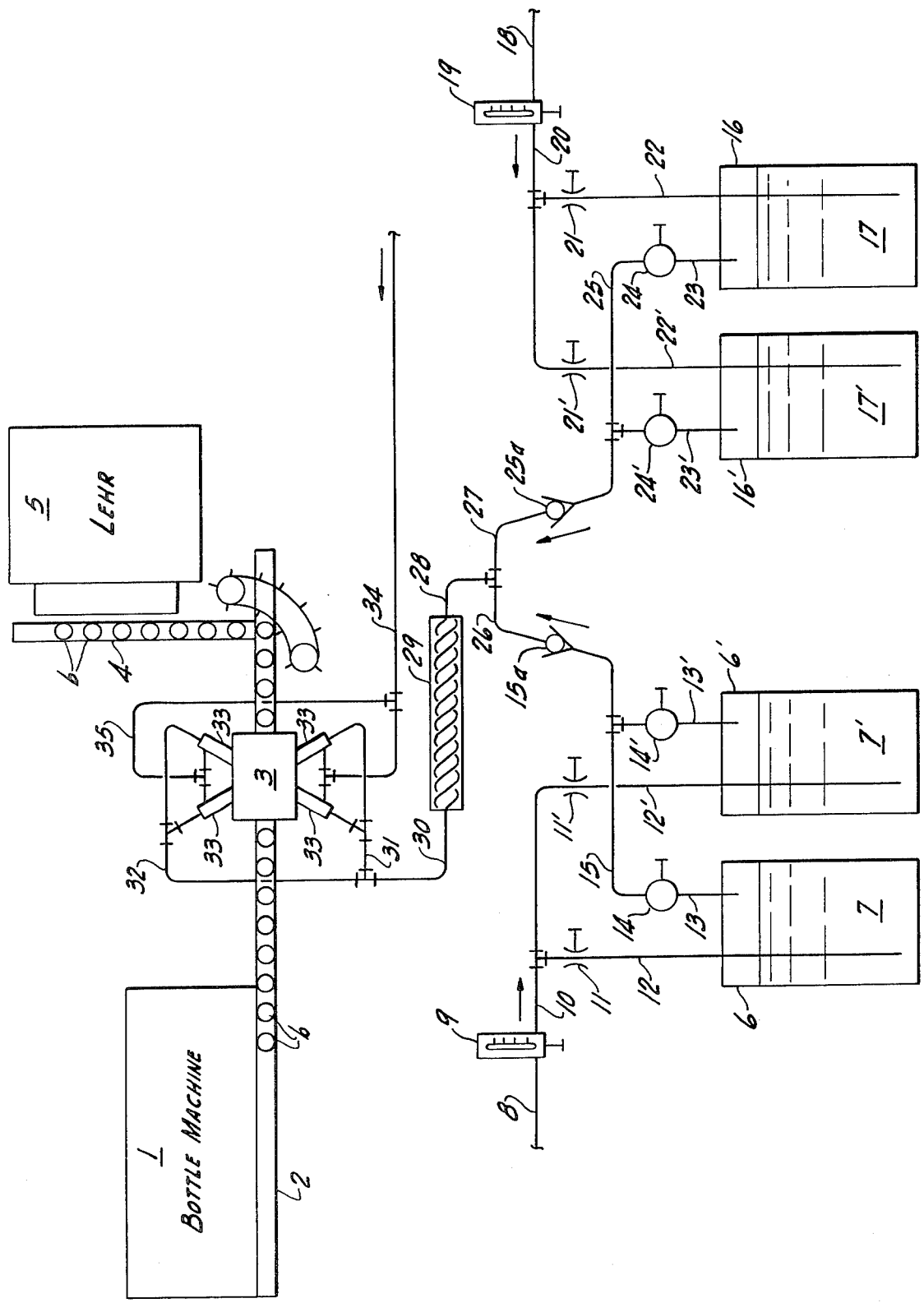

PROCESS FOR FORMING RUST RESISTANT TIN OXIDE COATINGS ON GLASS CONTAINERS

The present invention relates to an improved process for preventing the formation of rust on bottles coated with a tin tetrachloride-based coating. Bottles have long been coated with a coating of tin oxide to provide wet and dry scratch and abrasion resistance to the glass surface and to thus reduce the problem of breakage of the containers during handling.

The coating of tin oxide is formed on the bottles by passing the bottles, after exit from a forming machine and while still hot, through a tunnel and injecting into the tunnel a flow of a tin halide such as tin tetrachloride. Upon contact of the glass bottles with the atmosphere in the tunnel, a film or coating of tin oxide is formed over the glass container to protect the glass containers from abrasion and preserve the strength of the glass container. A subsequent polymer coating may then be applied to provide lubricity.

A problem that is present when a tin oxide coating is applied to glass is that the container tends to have formed thereon a rust-like ring or layer when metal caps are used to seal the container. It is believed that the rust formation is caused by a galvanic action which occurs between the tin oxide coating and the metal of the cap, in the presence of humidity or other moisture. It has previously been proposed to add a mixture of tin tetrachloride and a phosphorous compound, such as phosphorous trichloride or phosphorous oxychloride to the hot tunnel through which the glass containers pass, with the mixture forming a tin-phosphorous oxide coating on the glass containers, the resultant coating providing rust resistance and preventing formation of rust-like rings on the neck of the container when metal caps are used to seal the same. Earlier approaches provided for passage of dry air through an enclosure containing a mixture of the tin compound and the phosphorous compound. Due to variances in vapor pressures, however, the control of the ratio of tin compound to phosphorous compound which was injected into the tunnel was difficult and the precise composition of the atmosphere in the tunnel difficult to maintain.

BRIEF SUMMARY OF THE INVENTION

An improved process for the formation of a rust-resistant coating on glass containers by formation of a tin oxide coating thereon during passage of the hot containers through a tunnel adjacent the forming machine, and while the containers are at a temperature of 500°–720° C., wherein dry air is passed through a container of tin tetrachloride to form a first fluid stream and dry air is passed through a container of phosphorous halide such phosphorous trichloride or phosphorous oxychloride to form a second fluid stream, combining the two fluid streams to form a fluid coating stream containing tin tetrachloride and phosphorous halide in a ratio, by weight, of between 2:1 and 9:1, and introducing the fluid coating stream, along with supplemental air, into the tunnel to contact glass containers passing therethrough so as to form a rust-resistant, scratch resistant coating on the glass containers.

DETAILED DESCRIPTION

The present invention provides a process for the formation of a modified tin oxide, rust resistant, scratch resistant coating on glass containers, such as bottles. The process is especially useful in coating non-returnable glass bottles of conventional sodium-calcium-silicon glass.

The glass bottles, while still hot after discharge from the bottle forming machine, are contacted with controlled streams of reactants of tin tetrachloride and a phosphorous halide, in an enclosed atmosphere such that the reactants combine to coat the glass.

A first fluid stream is formed by passage of dry air through a bath of tin tetrachloride held in a closed container, the dry air, at a predetermined rate, bubbled through the bath. A second fluid stream is likewise formed by passage of dry air through a bath of a phosphorous halide held in a separate closed container, the dry air, at a second predetermined rate, bubbled through the bath of phosphorous halide.

The phosphorous halide is selected from the group consisting of phosphorous trichloride and phosphorous oxychloride.

The two fluid streams are combined and intimately mixed to form a fluid coating stream, which stream is passed into a tunnel through which the glass bottles are passing, with filtered air also injected into the tunnel. This filtered air is passed through a fitting means so as to remove oil, dust, dirt or other foreign matter, but is not treated so as to remove moisture. The filtered air provides a carrier and dispersing means for the fluid coating stream in order to provide a mist of reactants within the tunnel.

By use of a dual flow of fluid streams in the formation of the fluid coating stream, the precise control of the ratio by weight, of reactants within the tunnel can be provided. It has been found that the weight ratio of tin tetrachloride to phosphorous halide in the fluid coating stream, and thus in the tunnel where these reactants contact and form the desired coating on the glass bottles, should be between 2:1 and 9:1. The use of an amount of phosphorous halide above this ratio will produce a bubbled or blistered surface coating on the container which can lead to weakening of the coating adherence to the glass, while the use of phosphorous halide below this ratio will not provide the desired degree of rust resistance needed. An especially useful and preferred weight ratio of tin tetrachloride to phosphorous halide is in the range of 3:1 to 4:1, which ratio provides exceptionally good rust resistance as well as adherence of the coating to the glass with a substantially unblistered surface.

The flow rate of the two fluid streams, the fluid coating stream, and the filtered air should be maintained such that the contact of the streams with the glass bottles passing through the tunnel will be sufficient to form a coating on the glass bottles that is of a thickness of between 350–450 angstroms (Å), preferably about 400 Å.

Referring now to the drawing, which is a schematic illustration of the present process, glass containers are formed in a bottle forming machine 1 and transferred hot to a conveyor 2. The conveyor 2 passes through a hood or tunnel 3 carrying the bottles b therethrough, and after exit from the tunnel 3 the bottles are transferred to a cross-conveyor 4 and fed to a lehr 5 in which the bottles are subject to annealing and passed to further processing or end use. It is in the tunnel 3, situate between the bottle forming machine and the annealing lehr, at which time the bottles are at a temperature in a range of between 500°–720° C. that the bottles are coated according to the present process.

A first container 6 is provided which contains stannic chloride (SnCl₄), designated as 7 in the drawing. A flow of dry air is provided through line 8, which flow is controlled by a flow adjustment device 9, and is charged through line 10, valve 11, and line 12 into the supply of stannic chloride and exits container 6, carrying stannic chloride therewith as a first fluid stream, through line 13, and through valve 14, to line 15.

A second container 16 is also provided which contains a phosphorous halide, either phosphorous trichloride (PCl₃) or phosphorous oxychloride (POCl₃), designated as 17 in the drawing. A second flow of dry air is provided through line 18, which flow is controlled by a flow adjustment device 19, and is charged through line 20, valve 21, and line 22 into the supply of phosphorous halide 17. This dry air is bubbled through the phosphorous halide and exits container 16, carrying phosphorous halide therewith, as a second fluid stream, through line 23, and through valve 24 to line 25.

The first fluid stream from line 15 passes through a check valve 15a into line 26, while the second fluid stream from line 25 passes through a check valve 25a into line 27 and the two fluid streams merge in line 28. From line 28, the merged fluid streams are passed through a static mixer 29 with formation of a fluid coating stream that is carried by line 30 to the area of the tunnel 3. The fluid coating stream is carried from line 30 to branch lines 31 and 32 and is charged to injectors 33 which inject the fluid stream, along with a supplemental supply of filtered air from line 34 and branch line 35, into the tunnel 3 where the fluid stream contacts the bottles b to form the the rust resistant, scratch resistant coating thereon.

As an example of the present process, a series of 12 oz. non-returnable glass bottles of soda lime silica glass, which were made at a rate of 184 bottles per minute were passed through a tunnel, appoximately three feet long, in which they were exposed to the following coating composition, the time of contact of the hot bottles to the coating vapors in the tunnel being about two seconds, with formation of a rust-resistant coating on the bottles of about 400 Å thickness. The pressure of the air fed to both a stannic chloride and a phosphorous trichloride tank was 10 pounds/in.² The flow rates and material weights used are listed in Table I, with formation of a stannic chloride fluid stream and a phosphorous trichloride fluid stream which were combined to form a fluid coating stream. The fluid coating stream was then injected into the tunnel in admixture with filtered air, at a flow rate of 250 ft.³/hr., the filtered air pressurized to 20 pounds/in.² Table I lists the material used during a 24 hour period and the ratios maintained:

TABLE I

| Run No. | Stannic Chloride | | Phosphorous Trichloride | | Ratio of SnCl₄/PCl₃ |
| --- | --- | --- | --- | --- | --- |
| | Air Flow Rate (cfh) | Amount (lbs/24 hrs) | Air Flow Rate (cfh) | Amount (lbs/24 hrs) | |
| 1 | 30 | 33 | 15 | 16.5 | 2:1 |
| 2 | 30 | 33 | 10 | 11.0 | 3:1 |
| 3 | 25 | 27.5 | 8 | 8.8 | 3:1 |
| 4 | 25 | 27.5 | 6 | 6.6 | 4.1:1 |
| 5 | 24 | 26.4 | 7.2 | 7.92 | 3.3:1 |
| 6 | 22 | 24.2 | 8 | 8.8 | 2.7:1 |
| 7 | 20 | 22 | 7 | 7.7 | 2.9:1 |

The resultant bottles were provided with an enhanced scratch resistance over conventional tin oxide coated bottles and the coating was rust resistant, such that a film or ring of rust did not subsequently develop upon subsequent placement of a metal cap thereon.

Although the use of a stannic chloride-phosphorous halide coating is preferred in order to provide a scratch resistant and rust resistant coating on glass containers according to the present invention, minor amounts of other metallic halides may replace a portion of the stannic chloride. As examples of such other metallic halides, there are metal halides selected from silicon tetrachloride, titanium tetrachloride, or chlorides of aluminum, zinc or zirconium. In the case of silicon tetrachloride and titanium tetrachloride, passage of dry air therethrough will be effective, while in the case of aluminum, zinc and zirconium the chlorides must be heated or otherwise converted to a fluid state for admixture with the stannic chloride. The amount of such other metallic halides which is used is an amount to replace less than about 10 percent by weight of the stannic chloride. Such additional metal oxides may be incorporated in order to provide other properties to the coating in addition to the scratch resistant and rust resistant provided by the primary stannic-phosphorous coating on the bottles.

What is claimed is:

1. In a process for the formation of a coating on a glass container by the formation of a tin oxide coating on the containers during passage through a tunnel adjacent the forming machine, wherein the bottles are at a temperature of between about 500°–720° C.; the improvement wherein said coating is rendered rust resistant and the scratch resistance thereof is enhanced by:
    passing dry air through a bath of tin tetrachloride to form a first fluid stream;
    passing dry air through a bath of a phosphorous halide, selected from the group consisting of phosphorous trichloride or phosphorous oxychloride, to form a second fluid stream;
    combining the first and second fluid streams, and intimately mixing said streams, to form a fluid coating stream comprising air containing tin tetrachloride and said phosphorous halide in a ratio, by weight, of between 2:1 and 9:1;
    combining said fluid coating stream with additional air, and
    introducing said fluid coating stream combined with said additional air into said tunnel for contact with containers passing therethrough, whereby said rust resistant, scratch resistant coating is formed on said containers.

2. The process defined in claim 1 wherein said phosphorous halide is phosphorous trichloride.

3. The process defined in claim 1 wherein said phosphorous halid is phosphorous oxychloride.

4. The process defined in claim 1 wherein the ratio of tin tetrachloride and phosphorous halide is between 3:1 to 4:1.

5. The process defined in claim 1 wherein the coating formed has a thickness of between 350–450 angstroms.

6. The process defined in claim 5 wherein the coating found has a thickness of about 400 angstroms.

7. The process defined in claim 1 wherein up to ten percent of said tin tetrachloride is replaced by a metal halide selected from the group consisting of silicon tetrachloride and titanium tetrachloride.

8. The process defined in claim 1 wherein up to ten percent of said tin tetrachloride is replaced by a metal halide selected from the group consisting of chlorides of aluminum, zinc or zirconium.

9. In a process for the formation of a coating on a glass container by the formation of a tin oxide coating on the containers during passage through a tunnel adjacent the forming machine, wherein the bottles are at a temperature of between about 500°–720° C.; the improvement wherein said coating is rendered rust resistant and the scratch resistance thereof is enhanced by:

- passing dry air through a bath of tin tetrachloride to form a first fluid stream;
- passing dry air through a bath of phosphorous trichloride to form a second fluid stream;
- combining and intimately mixing the first and second fluid streams to form a fluid coating stream comprising air containing tin tetrachloride and said phosphorous halide in a ratio, by weight, of between 3:1 to 4:1;
- combining said fluid coating stream with a stream of air; and
- introducing said combined streams into said tunnel for contact with containers passing therethrough, whereby said rust resistant, scratch resistant coating, having a thickness of between 350–450 angstroms, is formed on said containers.

* * * * *